United States Patent
Shmilovich et al.

(10) Patent No.: US 8,827,212 B1
(45) Date of Patent: Sep. 9, 2014

(54) METHOD AND APPARATUS FOR SUPPLYING A GAS JET OVER AN AERODYNAMIC STRUCTURE

(75) Inventors: Arvin Shmilovich, Huntington Beach, CA (US); Yoram Yadlin, Irvine, CA (US)

(73) Assignee: The Boeing Company, Chicago, IL (US)

(*) Notice: Subject to any disclaimer, the term of this patent is extended or adjusted under 35 U.S.C. 154(b) by 208 days.

(21) Appl. No.: 13/525,655

(22) Filed: Jun. 18, 2012

(51) Int. Cl.
*B64C 3/00* (2006.01)
*B64C 21/04* (2006.01)

(52) U.S. Cl.
USPC .................................................. 244/207

(58) Field of Classification Search
USPC ............. 244/207, 208, 200.1, 201, 198, 204, 244/206; 137/624.13; 251/209
See application file for complete search history.

(56) References Cited

U.S. PATENT DOCUMENTS

| | | | |
|---|---|---|---|
| 1,219,265 A * | 3/1917 | Denhard | 392/314 |
| 1,922,825 A * | 8/1933 | Squires | 244/53 R |
| 2,896,881 A * | 7/1959 | Attinello | 244/207 |
| 2,973,922 A * | 3/1961 | Davidson et al. | 244/15 |
| 3,025,026 A * | 3/1962 | Nichols | 244/87 |
| 3,467,043 A * | 9/1969 | Bowles | 114/278 |
| 3,584,811 A | 6/1971 | Leavy et al. | |
| 3,612,444 A * | 10/1971 | Girard | 244/7 A |
| 3,669,386 A * | 6/1972 | Jacobs et al. | 244/52 |
| 3,670,994 A * | 6/1972 | Kizilos | 244/207 |
| 3,790,107 A * | 2/1974 | Renshaw | 244/207 |
| 3,854,678 A * | 12/1974 | Geres | 244/3.16 |
| 3,936,013 A * | 2/1976 | Yuan | 244/199.3 |
| 3,974,987 A | 8/1976 | Shorr | |
| 4,860,976 A | 8/1989 | McFadden et al. | |
| 6,142,425 A | 11/2000 | Armanios et al. | |
| 7,484,930 B2 * | 2/2009 | Hutcheson et al. | 415/119 |
| 8,128,036 B2 * | 3/2012 | Boldrin et al. | 244/208 |
| 8,408,498 B2 * | 4/2013 | Lorkowski | 244/206 |
| 2009/0108125 A1 * | 4/2009 | Shmilovich et al. | 244/15 |
| 2011/0024574 A1 * | 2/2011 | Lorkowski | 244/206 |
| 2011/0108672 A1 | 5/2011 | Shmilovich | |
| 2012/0256049 A1 * | 10/2012 | Shmilovich et al. | 244/1 N |

* cited by examiner

*Primary Examiner* — Tien Dinh
*Assistant Examiner* — Michael A Fabula
(74) *Attorney, Agent, or Firm* — Armstrong Teasdale LLP (57) ABSTRACT

An apparatus for supplying a gas flow over an aerodynamic structure is provided. The apparatus includes a fluid source for supplying the gas flow and a flow control actuator configured to receive the gas flow from the fluid source. The flow control actuator is also configured to selectively direct the gas flow over the aerodynamic structure when the flow control actuator is in at least one predetermined operating position and to restrict the gas flow over the aerodynamic structure when the flow control actuator is in another of the predetermined operating positions.

18 Claims, 7 Drawing Sheets

METHOD AND APPARATUS FOR SUPPLYING A GAS JET OVER AN AERODYNAMIC STRUCTURE

BACKGROUND OF THE INVENTION

The field of the invention relates generally to aircraft control systems and, more particularly to methods and systems for enhanced control of a vertical tail of an aircraft.

At least some known vehicles capable of flight include one or more vertical tails to provide directional control for the vehicle. For example, at least some known aircraft include one or more vertical tails that include a stabilizer and a rudder. In such aircraft, the vertical tail provides yaw control of the aircraft.

At least some known aircraft must be designed to compensate for an unbalanced yaw moment during certain operating conditions. For example, at least some multi-engine aircraft experience an unbalanced yaw moment during a one-engine inoperative (OEI) condition. During an OEI condition, one engine malfunctions such that operation of the remaining engine may induce rotation of the aircraft about a yaw axis in a rotational direction towards the inoperative engine. At least some of such known aircraft compensate for unbalanced yaw moment using a vertical tail.

Generally, the size of a vertical tail is determined by the amount of directional control that is required for an aircraft. Furthermore, the drag of an aircraft during flight is dependent on the size of the vertical tail. For example, a larger vertical tail results in increased drag of the aircraft. Drag increases the fuel consumption and limits the distance an aircraft can travel without refueling. Moreover, when an aircraft operates at a low velocity, the vertical tail has a decreased amount of control over the aircraft when compared to when the aircraft operates at a high velocity. For example, a large vertical tail is required to provide sufficient directional control of an aircraft during an OEI condition when the aircraft is operating at a low velocity. As such, it may be desirable to augment tail control authority to compensate for an OEI condition during takeoff and enable the use of a reduced size vertical tail.

BRIEF DESCRIPTION OF THE INVENTION

In one aspect, an apparatus for supplying a gas flow over an aerodynamic structure is provided. The apparatus includes a fluid source for supplying the gas flow and a flow control actuator configured to receive the gas flow from the fluid source. The flow control actuator is also configured to selectively direct the gas flow over the aerodynamic structure when the flow control actuator is in at least one predetermined operating position and to restrict the gas flow over the aerodynamic structure when the flow control actuator is in another of the predetermined operating positions.

In another aspect, a method for supplying a gas flow over an aerodynamic structure is provided. The aerodynamic structure has a first side and a second side, and a first gas ejection slot is defined within the first side and a second gas ejection slot is defined within the second side. The first and second gas ejection slots are located upstream of a control member. The method comprises directing the gas flow through one of the first gas ejection slot and the second gas ejection slot such that the gas flow flows over the aerodynamic structure.

In yet another aspect, an assembly for use with an aircraft is provided. The assembly includes an aerodynamic structure, a control member coupled to the aerodynamic structure, a flow control actuator, and a fluid source. The flow control actuator is positioned at least partially within the aerodynamic structure and located upstream of the control member. The fluid source is configured to supply a gas flow to the flow control actuator such that the flow control actuator selectively directs the gas flow over the aerodynamic structure when the flow control actuator is in at least one predetermined operating position and restricts the gas flow over the aerodynamic structure when the flow control actuator is in another of the predetermined operating positions.

DETAILED DESCRIPTION OF THE INVENTION

Embodiments of the present invention are directed to aircraft assemblies and, more specifically, to a flow control actuator for supplying a gas flow over an aerodynamic structure. Even more specifically, embodiments of the present invention are directed to a flow control actuator that may be located within the vertical tail of an aircraft to enable compensation of unbalanced yaw forces applied to the aircraft. The flow control actuator described herein includes concentric members that each include one or more slots configured to selectively direct airflow through ejector slots defined within opposite sides of a vertical stabilizer. More specifically, in the exemplary embodiment, an outer member of the flow control actuator is linked to a tail rudder of the vertical tail. As such, during an OEI condition, the tail rudder moves into a first position to maintain directional control of the aircraft. The combination of rudder deflection and traverse actuation facilitates providing sufficient directional control to compensate for unbalanced yaw forces while reducing the size of the vertical tail.

Figure 1:
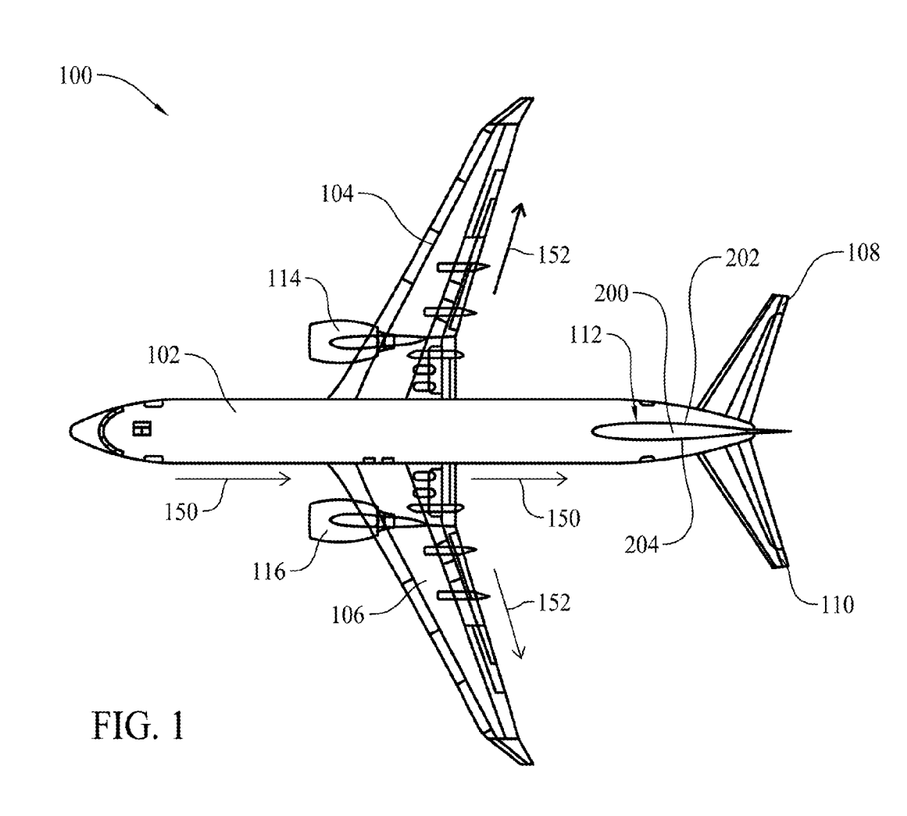
FIG. 1 is a top view of an exemplary aircraft.

FIG. 1 is a perspective view of an exemplary aircraft 100. In the exemplary embodiment, aircraft 100 includes a fuselage 102 that extends in a streamwise direction 150. As used herein, the term streamwise direction 150 refers generally to the direction of external air flowing past and over the surfaces of aircraft 100. Fuselage 102 includes a first wing 104 and a second wing 106 that each extend outward from fuselage 102 in a spanwise direction 152 that is generally perpendicular to streamwise direction 150. In the exemplary embodiment, a first engine 114 is coupled to first wing 104, and a second engine 116 is coupled to second wing 106. Although illustrated as including two engines, aircraft 100 may include any number of engines that enables aircraft 100 to function as described herein.

Moreover, in the exemplary embodiment, aircraft 100 also includes a first horizontal tail 108, a second horizontal tail 110, and a vertical tail 112. Although shown as having a single vertical tail 112, aircraft 100 may include more than one vertical tail or a V-tail arrangement. First and second horizontal tails 108 and 110 each extend from fuselage 102 in spanwise direction 152. Vertical tail 112 extends from fuselage 102 substantially perpendicularly with respect to tails 108 and 110. In the exemplary embodiment, vertical tail 112 includes a vertical stabilizer 200 that includes a first side 202, a second side 204 that is opposite side 202, and a control member coupled to vertical stabilizer 200. The control member may be an aileron, a flap, and/or any suitable control member. In the exemplary embodiment, the control member is a tail rudder 210 (not shown in FIG. 1).

Figure 2:
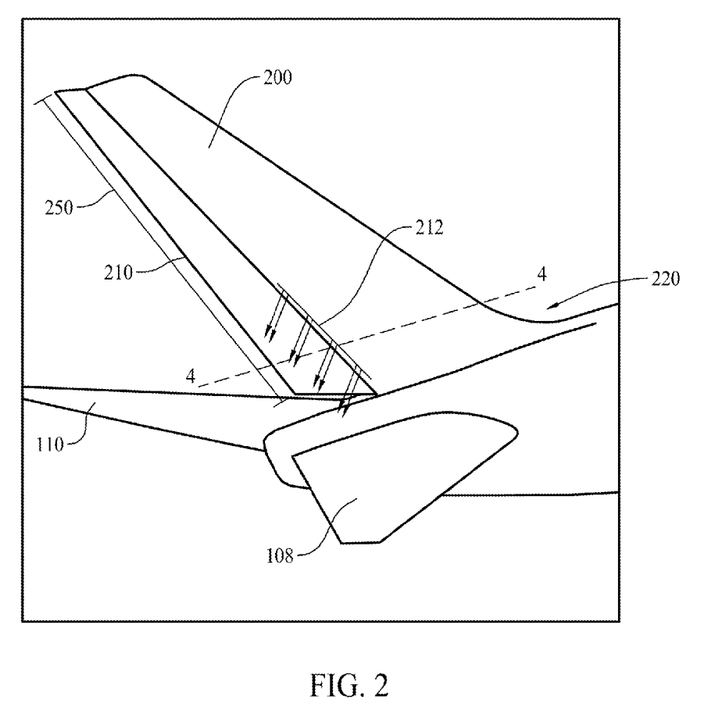
FIG. 2 is a perspective view of an exemplary vertical tail used with the aircraft shown in FIG. 1.

FIG. 2 is a perspective view of aircraft vertical stabilizer 200. In the exemplary embodiment, vertical stabilizer 200 includes first and second sides 202 and 204 (shown in FIG. 1), and tail rudder 210 coupled to vertical stabilizer 200. A first gas ejection slot 212 is defined within first side 202 vertical stabilizer 200 and second gas ejection slot 214 (not shown in FIG. 2) is defined within second side 204 of vertical stabilizer 200. Ejection slots 212 and 214 are defined within vertical stabilizer 200 at locations upstream from tail rudder 210. Furthermore, in the exemplary embodiment, ejection slots 212 and 214 each extend substantially parallel to tail rudder 210 and span across approximately 30% of a length 250 of vertical tail 200. In an alternative embodiment, ejection slots 212 and 214 may span across any length 250 of vertical tail 200, including the entire length 250 of vertical tail 200.

Figure 3:
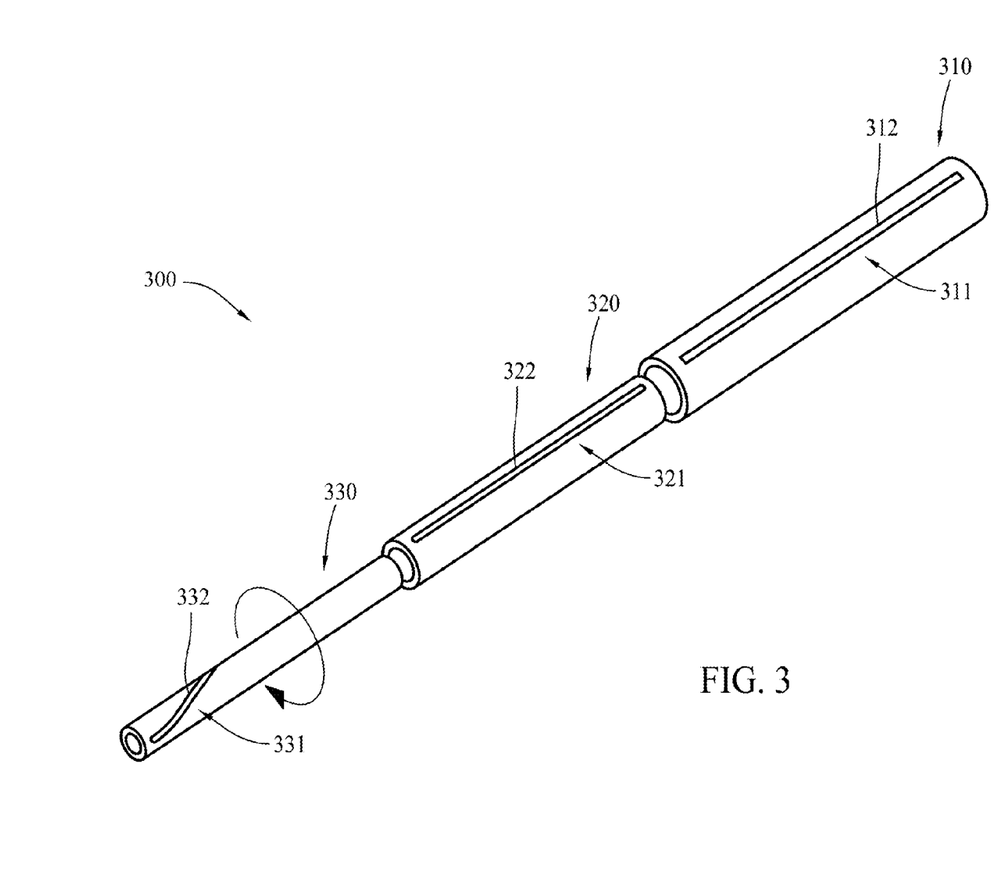
FIG. 3 is a perspective view of an exemplary flow control actuator that may be used with a vertical tail of the aircraft shown in FIG. 1.

FIG. 3 is a perspective view of an exemplary flow control actuator 300 that has not been inserted into vertical stabilizer 200 (shown in FIG. 2). In the exemplary embodiment, flow control actuator 300 includes an outer member 310, an intermediate member 320, and an inner member 330. In the exemplary embodiment, members 310, 320, and 330 each have a cylindrical and/or substantially cylindrical shape. However, it should be understood that members 310, 320, and 330 may have any suitable shape such that flow control actuator 300 functions as described herein. In the exemplary embodiment, members 310, 320, and 330 each include slots 311, 321, and 331, respectively, that direct gas flow over vertical stabilizer 200. For example, in the exemplary embodiment, outer member 310 includes a first longitudinal slot 312 and a second longitudinal slot 314 (not shown in FIG. 3) that each substantially extend the length of outer member 310, intermediate member 320 includes a first lateral slot 322 and a second lateral slot 324 (not shown in FIG. 3) that each substantially extend the length of intermediate member 320, and inner member 310 includes a helical slot 332 that substantially circumscribes inner member 330.

In alternative embodiments, helical slot 332 may include a screw-like configuration, a spiral-like configuration, a coiling configuration, and/or a winding configuration as helical slot 332 circumscribes the length of inner member 330. Furthermore, it should be understood that the pitch of helical slot 332 may vary as it circumscribes the length of inner member 330. In other alternative embodiments, slots 311, 321, and 331 may be ports, apertures, orifices, slits, holes and/or any suitable configuration such that flow control actuator 300 functions as described herein. Furthermore, it should be understood that the slots, ports, apertures, orifices, slits, or holes may vary in width and/or diameter along the length of members 310, 320, and 330.

In the exemplary embodiment, members 310, 320, and 330 are each inserted into vertical stabilizer 200. For example, in the exemplary embodiment, outer member 310 is positioned at least partially within vertical stabilizer 200 such that slots 312 and 314 are substantially parallel with respect to ejection slots 212 and 214. Intermediate member 320 is then positioned at least partially within outer member 310 such that lateral slots 322 and 324 are substantially parallel with respect to slots 312 and 314. Inner member 330 is positioned at least partially within intermediate member 320 such that at least a portion of helical slot 332 is substantially aligned with lateral slots 322 and 324. In the exemplary embodiment, flow control actuator 300 is positioned adjacent to a base 220 of vertical stabilizer 200. Furthermore, in alternative embodiments, more than one flow control actuator 300 may be positioned within vertical stabilizer 200. For example, any suitable number of flow control actuators 300 may be used to span the length of ejection slots 212 and 214

Figure 4:
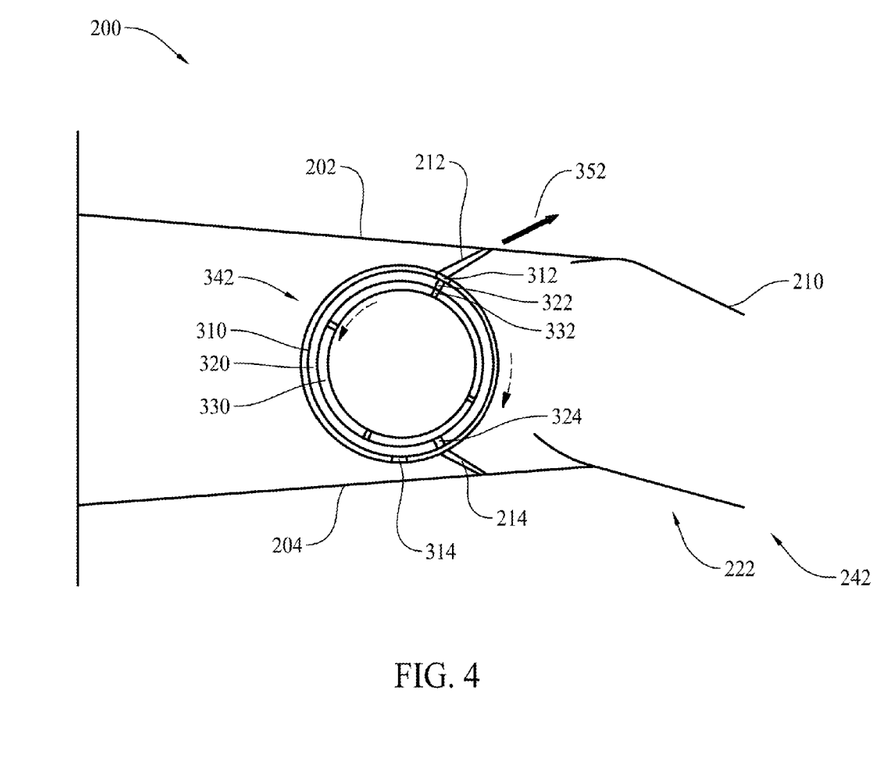
FIG. 4 is a cross-sectional view of an exemplary assembled flow control actuator shown in a first operating position and taken along Line 4-4.
Figure 5:
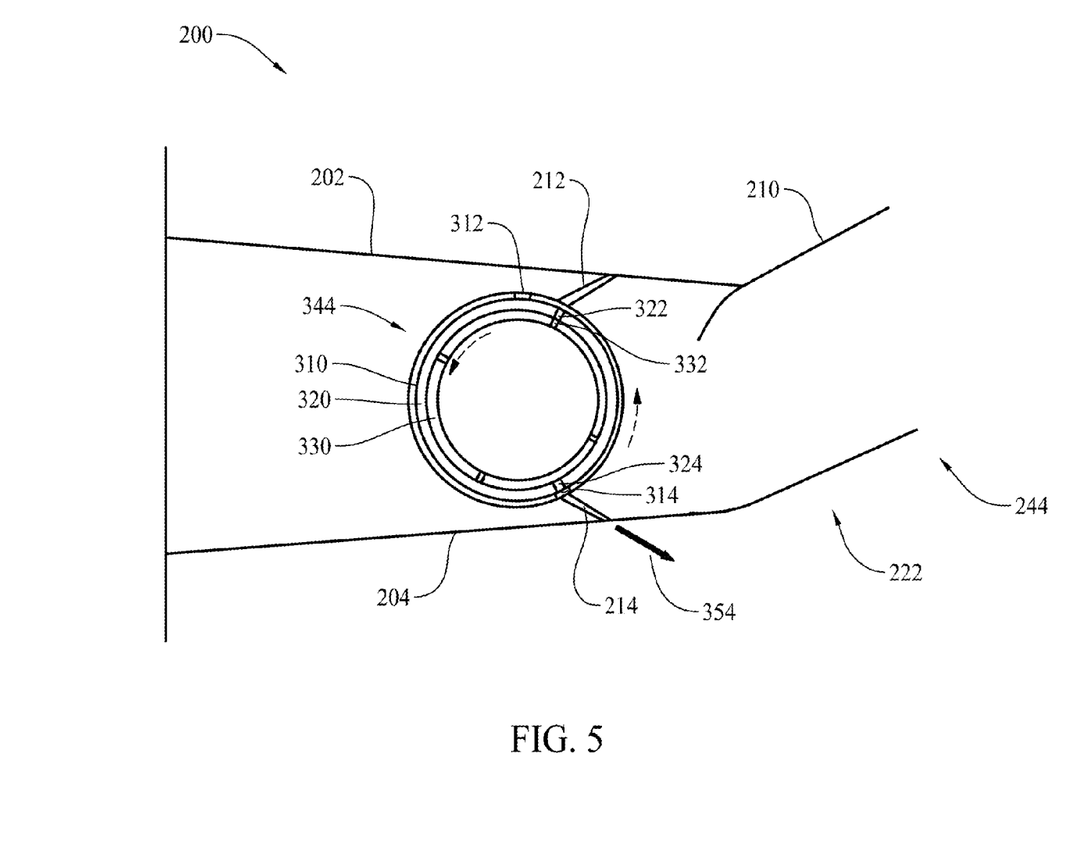
FIG. 5 is a cross-sectional view of the assembled flow control actuator shown in FIG. 4 in a second operating position and taken along Line 4-4.
Figure 6:
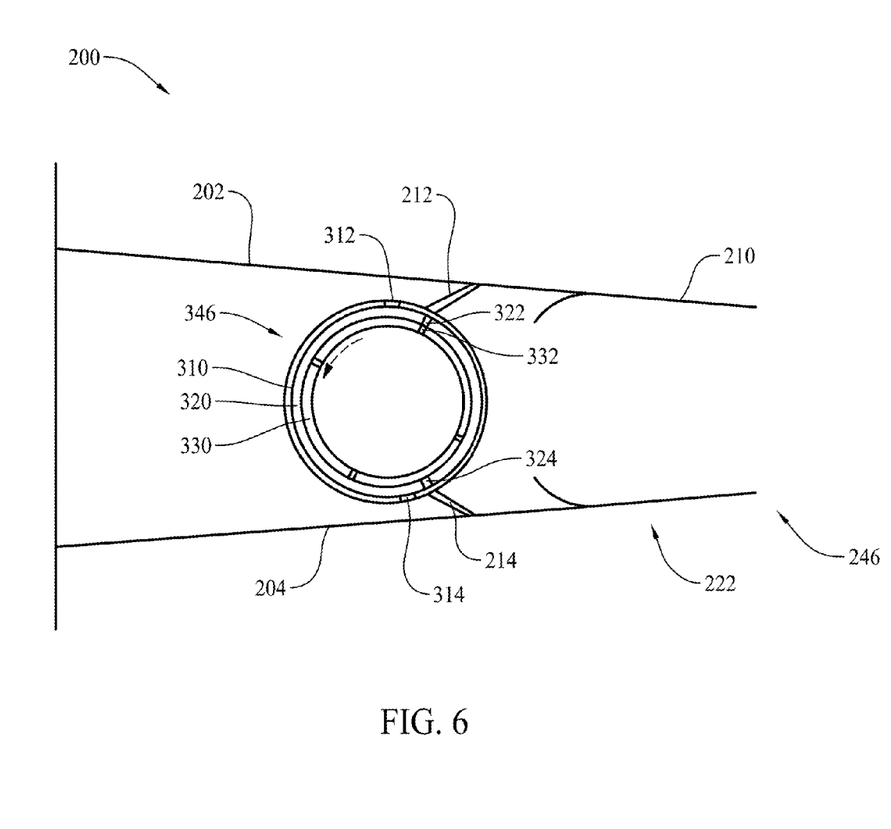
FIG. 6 is a cross-sectional view of the assembled flow control actuator shown in FIG. 4 in a third operating position and taken along Line 4-4.

FIG. 4 is a cross-sectional view of flow control actuator 300 positioned within vertical stabilizer 200 in a first predetermined operating position 342 and taken along line 4-4 (shown in FIG. 2), FIG. 5 is a cross-sectional view of flow control actuator 300 positioned within vertical stabilizer 200 in a second predetermined operating position 344 and taken along line 4-4, and FIG. 6 is a cross-sectional view of flow control actuator 300 positioned within vertical stabilizer 200 in a third predetermined operating position 346 and taken along line 4-4. In the exemplary embodiment, intermediate member 320 is securely positioned between inner and outer members 330 and 310, respectively, such that intermediate member 320 is maintained substantially stationary relative to members 330 and 310. Furthermore, in the exemplary embodiment, first lateral slot 322 is substantially aligned with first ejection slot 212 and second lateral slot 324 is substantially aligned with second ejection slot 214. Inner member 330 is rotatable within intermediate member 320 such that at least a portion of helical slot 332 is substantially aligned with lateral slots 322 and 324. For example, inner member 330 may be rotated within intermediate member 320 via a motor (not shown).

In the exemplary embodiments, outer member 310 is coupled either directly or indirectly to an actuation unit 222 that selectively moves outer member 310 between first and second positions 342 and 344. For example, in the exemplary embodiment, actuation unit 222 is tail rudder 210 and outer member 310 is coupled to tail rudder 210 for selectively directing gas flow over vertical stabilizer 200. During an OEI condition, tail rudder 210 moves into either first position 242 when first engine 114 is inoperative, or into second position 244 when second engine 116 is inoperative. When tail rudder 210 is in first position 242, flow control actuator 300 is moved into first position 342 such that first longitudinal slot 312 is substantially aligned with first ejection slot 212 and first lateral slot 322. When tail rudder 210 is in second position 244, flow control actuator 300 is moved into second position 344 such that second longitudinal slot 314 is substantially aligned with second ejection slot 214 and second lateral slot 324. As such, when in first position 342, outer member 310 substantially aligns first longitudinal slot 312, and second longitudinal slot 314 is displaced from second ejection slot 214 and second lateral slot 324. Similarly, when in second position 344, outer member 310 substantially aligns second longitudinal slot 314, and first longitudinal slot 312 is displaced from first ejection slot 212 and first lateral slot 322. As first longitudinal slot 312 is misaligned, flow communication from first lateral slot 322 to first ejection slot 212 is stopped. Similarly, as second longitudinal slot 314 is misaligned, flow communication from second lateral slot 324 to second ejection slot 214 is stopped. As such, during such operational periods, gas flow may only be supplied through either ejection slot 212 or 214 and over vertical stabilizer 200 at that time. For example, in the exemplary embodiment, a first gas flow 352 may be directed over first side 202 of vertical stabilizer 200 when tail rudder 210 and flow control actuator 300 are in first positions 242 and 342, and a second gas flow 354 may be directed over second side 204 of vertical stabilizer when tail rudder 210 and flow control actuator 300 are in second positions 244 and 344. As such, ejection slots 212 and 214 facilitate flow communication between flow control actuator 300 and first and second sides 202 and 204 of vertical stabilizer 200. Furthermore, the selective application of gas flow is done in concordance with the position of the control member such that when tail rudder 210 is deflected to one side of vertical stabilizer 200, gas flow is ejected on the opposite side vertical stabilizer 200.

Furthermore, in the exemplary embodiment, when in neutral third position 246, tail rudder 210 displaces first longitudinal slot 312 from first ejection slot 212 and first lateral slot 322, and displaces second longitudinal slot 314 from second ejection slot 214 and second lateral slot 324. In the exemplary embodiment, when aircraft 100 does not require high-rudder authority, tail rudder 210 is in third position 246. As such, when tail rudder 210 is in third position 246, outer member 310 is moved into third position 246 such that flow communication to ejection slots 212 and 214 is blocked and gas flow over vertical stabilizer 200 is restricted. In alternative embodiments, actuation unit 222 may be any unit that selectively moves outer member 310 into first and second positions 342 and 344.

In the exemplary embodiments, a fluid source such as engines 114 and 116 supply gas flow to inner member 330. In alternative embodiments, the fluid source may be an auxiliary power unit and/or an air compressor. In the exemplary embodiment, gas flow supplied to inner member 330 flows through helical slot 332, through lateral slots 322 and 324, and through longitudinal slot 312 or 314, prior to entering ejection slot 212 or 214 to form gas flow 352 and 354. In first position 242, tail rudder 210 substantially aligns at least a portion of helical slot 332, lateral slot 322, longitudinal slot 312, and ejection slot 212 in flow communication with each other. In second position 244, tail rudder 210 substantially aligns at least a portion of helical slot 332, lateral slot 324, longitudinal slot 314, and ejection slot 214 in flow communication with each other. In the exemplary embodiment, ejection slots 212 and 214 are obliquely oriented with respect to sides 202 and 204 of vertical stabilizer 200 such that gas flow 352 and 354 are directed in streamwise direction 150 over vertical stabilizer 200.

As such, in the exemplary embodiments, gas flow 352 and 354 facilitates increasing sectional side forces applied to vertical tail 112. The traverse actuation of outer member 310 to selectively directs gas flow 352 and 354 over vertical stabilizer 200 increases the side-force coefficient of the gas flow above baseline and up to inviscid side-force levels, reduces leading edge flow separation, and increases the load over the entire span of vertical tail 200.

Figure 7:
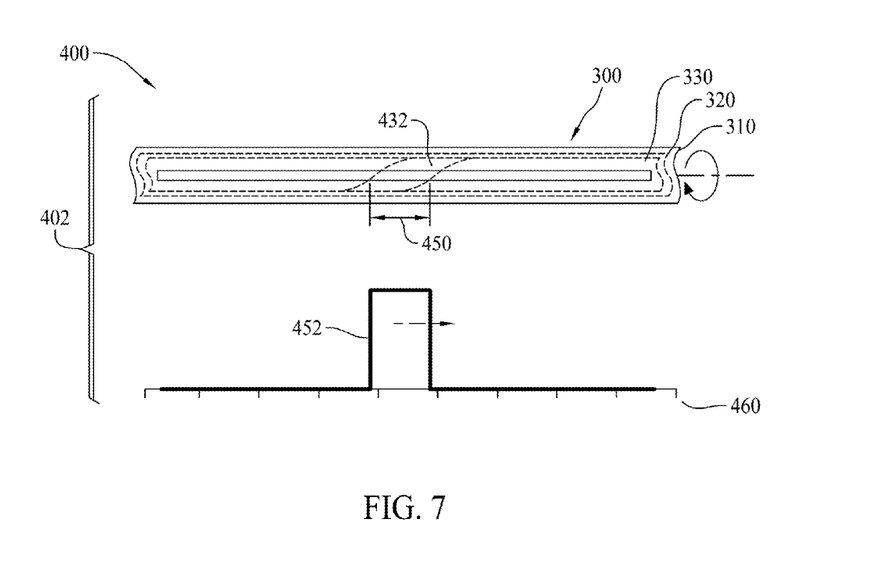
FIG. 7 is a partially transparent view of an exemplary assembled flow control actuator shown in FIG. 3 and in a first actuation mode.
Figure 8:
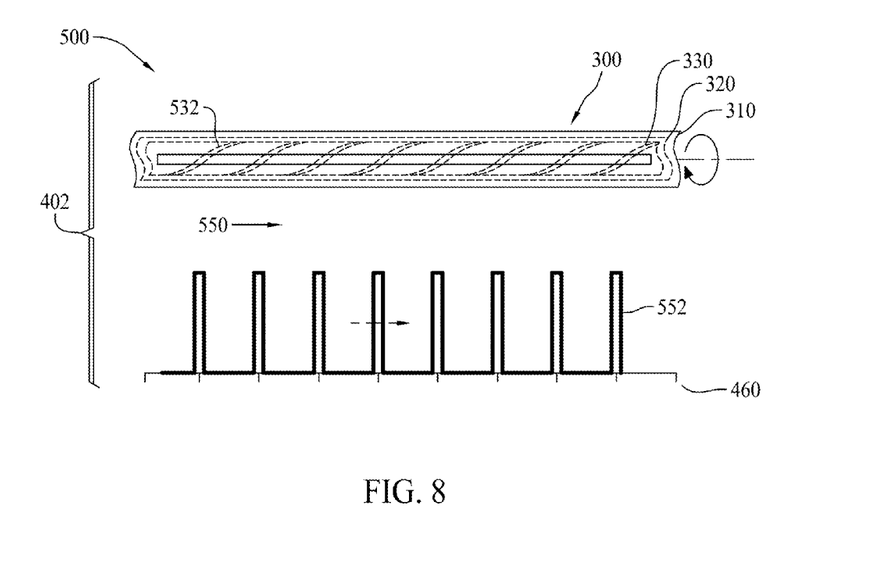
FIG. 8 is a partially transparent view of an exemplary assembled flow control actuator shown in FIG. 3 and in a second actuation mode.

FIGS. 7 and 8 are partially transparent views of flow control actuator 300 in a first actuation mode 400 and a second actuation mode 500. Although the overlap and substantial alignment of helical slots 432 and 532 with first lateral slot 322 will be described in more detail, it should be understood that the same is applicable to overlap and substantial alignment of helical slots 432 and 532 with second lateral slot 324. In the exemplary embodiment, the length of gas flow 452 and 552 are defined by an overlap 450 and 550 of helical slot 432 and 532 with lateral slot 322. For example, in the exemplary embodiment, overlap 450 of helical slot 432 with lateral slot 322 in first actuation mode 400 produces gas flow jet 452 that is about one eighth the length 460 of flow control actuator 300. As such, the amount of gas flow for gas flow jet 452 is approximately one-eighth of the amount of gas flow for constant supply along the length 460 of flow control actuator 300. Furthermore, as inner member 330 rotates, gas flow jet 452 moves along the length 460 of flow control actuator 300.

Furthermore, referring to FIG. 8, helical slot 532 is more tightly wound than helical slot 432 (shown in FIG. 7). As such, in the exemplary embodiment, overlap 550 of helical slot 532 with lateral slot 322 in second actuation mode 500 produces gas flow jet 552. Each overlap 550 is approximately one-eighth the length of overlap 450 and as inner member 330 rotates, gas flow jet 552 moves along the length 460 of flow control actuator 300. Furthermore, the intensity of gas flow jets 452 and 552 that are directed over vertical stabilizer 200 is defined by the height of gas flow jets 452 and 552 relative to a vertical axis 402.

The configuration of helical slots 432 and 532 is selected based on design control targets and goals of a particular application. For example, helical slots 432 and 532 may be oriented or configured such that any suitable number of gas flow jets may be directed through ejection slots 212 and 214 (shown in FIG. 4). Furthermore, the speed of gas flow jets 452 and 552 supplied over vertical stabilizer 200 may be controlled by varying the rotational speed of inner member 330. For example, as the rotational speed of inner member 330 increases, the speed of gas flow jets 452 and 552 moving across the length 460 of flow control actuator 300 increases.

The flow control actuator described herein facilitates increasing side forces applied to an aircraft assembly. More specifically, traverse actuation facilitates increasing the side-force coefficient of gas flow directed over an aerodynamic structure above baseline and at least up to inviscid flow levels. Even more specifically, traverse actuation facilitates increasing the side-force coefficient above that of baseline flow with 20° rudder authority by up to about 28%. Furthermore, traverse actuation facilitates reducing leading edge flow separation at an outboard tail section, and facilitates stabilizing the flow over the vertical tail of an aircraft. More specifically, traverse actuation stabilizes the flow on the vertical tail through an inboard main side-force buildup while maintaining nominal outboard sectional lift. Furthermore, inboard actuation facilitates increasing the load over the entire tail span due to sweep and taper characteristics of the tail.

As such, the flow control actuator described herein facilitates reducing the overall drag of an assembly capable of flight by facilitating reducing the size of a vertical tail. The flow control actuator enables the vertical tail to be generally smaller than known tails capable of providing the same directional control. The flow control actuator described herein has a plurality of concentric members that selectively direct gas flow over a vertical stabilizer to increase the side-force imparted by the vertical tail as compared to tails that do not use directed gas flow. As such, a smaller vertical tail that uses traverse actuation is provided to compensate for the same unbalanced yaw moment as is typically possible with a larger vertical tail. Reducing the size of a vertical tail facilitates enhanced aerodynamic efficiency, reduces overall weight of the aircraft, and thus increases the fuel efficiency and range of the aircraft.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An apparatus for supplying a gas flow over an aerodynamic structure, the apparatus comprising:
a flow control actuator coupleable to a fluid source to receive a gas flow from the fluid source, said flow control actuator configured to selectively direct the gas flow over the aerodynamic structure when said flow control actuator is in at least one predetermined operating position and to restrict the gas flow over said aerodynamic structure when said flow control actuator is in another of the predetermined operating positions, said flow control actuator comprising:
an outer member including a first slot;
an intermediate member positioned at least partially within said outer member, said intermediate member including a second slot; and
an inner member positioned at least partially within said intermediate member, said inner member including a helical slot that substantially circumscribes said inner member.

2. The apparatus in accordance with claim 1, wherein the aerodynamic structure comprises a first surface and an opposing second surface, and said flow control actuator is configured to selectively direct the gas flow over at least one of the first and second surfaces.

3. The apparatus in accordance with claim 2, wherein a first predetermined operating position directs the gas flow over said first surface of said aerodynamic structure.

4. The apparatus in accordance with claim 2, wherein a predetermined operating position directs the gas flow over said second surface of said aerodynamic structure.

5. The apparatus in accordance with claim 2, wherein a predetermined operating position is configured to restrict the gas flow by blocking the gas flow from being directed over either of said first and second surfaces of said aerodynamic structure.

6. The apparatus in accordance with claim 1, wherein when said flow control actuator is in one of the predetermined operating positions, said outer member is configured to place said first slot in flow communication with the fluid source.

7. The apparatus in accordance with claim 1, wherein at least one portion of said helical slot is configured to overlap with said second slot of said intermediate member.

8. The apparatus in accordance with claim 1, wherein said inner member is rotatable to align at least a portion of said helical slot with said second slot.

9. A method for supplying a gas flow over an aerodynamic structure having a first side and a second side opposite the first side, wherein a first gas ejection slot is defined within the first side and a second gas ejection slot is defined within the second side, the first and second gas ejection slots located upstream of a control member, said method comprising:
rotating at least one of an outer cylindrical member and an inner cylindrical member of a flow control actuator in a first direction to direct gas flow through the first gas ejection slot, the flow control actuator further including an intermediate cylindrical member, wherein the inner cylindrical member is positioned at least partially within the intermediate cylindrical member, and the intermediate cylindrical member is positioned at least partially within the outer cylindrical member, and the inner member includes a helical slot that substantially circumscribes said inner member; and
rotating the at least one of the outer cylindrical member and the inner cylindrical member in a second direction opposite the first direction to direct gas flow through the second gas ejection slot while restricting gas flow through the first ejection slot.

10. The method in accordance with claim 9 further comprising supplying a gas flow to the flow control actuator from a fluid source.

11. The method in accordance with claim 9, wherein:
said rotating at least one of an outer cylindrical member and an inner cylindrical member of a flow control actuator in a first direction comprises aligning a first slot of the outer cylindrical member with the first gas ejection slot; and
said rotating the at least one of the outer cylindrical member and the inner cylindrical member in a second direction opposite the first direction comprises aligning a second slot of the outer cylindrical member with the second gas ejection slot while moving the first slot out of alignment with the first gas ejection slot.

12. The method in accordance with claim 9 further comprising at least partially aligning the helical slot with a slot of the intermediate cylindrical member.

13. The method in accordance with claim 9 further comprising maintaining the intermediate cylindrical member in a fixed position while rotating the outer or inner cylindrical member.

14. An assembly for use with an aircraft, the assembly comprising:
an aerodynamic structure;
a control member coupled to said aerodynamic structure;
a flow control actuator positioned at least partially within said aerodynamic structure and located upstream of said control member, said flow control actuator comprising an outer member comprising a pair of first slots, an intermediate member positioned at least partially within said outer member and comprising a pair of second slots, and an inner member positioned at least partially within said intermediate member and comprising a helical slot that substantially circumscribes said inner member; and
a fluid source configured to supply a gas flow to said flow control actuator such that said flow control actuator selectively directs the gas flow over said aerodynamic structure when said flow control actuator is in at least one predetermined operating position and restricts the gas flow over said aerodynamic structure when said flow control actuator is in another of the predetermined operating positions.

15. The assembly in accordance with claim 14, wherein said inner member is configured to receive the gas flow from said fluid source, and said outer member is moveable to selectively direct the gas flow over the aerodynamic structure.

16. The assembly in accordance with claim 14, wherein said aerodynamic structure comprises a vertical stabilizer of a vertical tail, and wherein said control member comprises a tail rudder of said vertical tail.

17. The assembly in accordance with claim 14, wherein said aerodynamic structure comprises a first side and an opposing second side, said first side comprising a first gas ejection slot defined therein and said second side comprising a second gas ejection slot defined therein.

18. The assembly in accordance with claim 14, wherein said fluid source comprises one of an air compressor and an engine of the aircraft assembly.

\* \* \* \* \*